United States Patent [19]
Gallo

[11] 3,869,104
[45] Mar. 4, 1975

[54] AIRCRAFT BARRICADE NET ERECTION SYSTEM

[75] Inventor: Eugene Gallo, Philadelphia, Pa.

[73] Assignee: The United States of America as represented by the Secretary of the Navy, Washington, D.C.

[22] Filed: Nov. 28, 1973

[21] Appl. No.: 419,575

[52] U.S. Cl............................................ 244/110 C
[51] Int. Cl.............................................. B64f 1/02
[58] Field of Search....... 244/110 C, 110 R; 92/136, 92/138

[56] References Cited
UNITED STATES PATENTS

| | | |
|---|---|---|
| 2,844,127 | 7/1958 | Steiner............................. 92/136 X |
| 3,156,160 | 11/1964 | Meyer et al...................... 92/136 X |
| 3,367,608 | 2/1968 | Charno et al..................... 244/110 C |
| 3,468,500 | 9/1969 | Carlsson.......................... 244/110 C |

Primary Examiner—Trygve M. Blix
Assistant Examiner—Paul E. Sauberer
Attorney, Agent, or Firm—R. S. Sciascia; Henry Hansen

[57] ABSTRACT

A cross-runway barricade net is raised and lowered by hydraulically powered rotary actuator of the rack and pinion type. The hydraulic power pack contains an automatic recharge unit which permits rapid sequential raising and raising of the barricade net by quickly restoring the accumulator of the hydraulic power pack to its initial pressure value.

5 Claims, 3 Drawing Figures

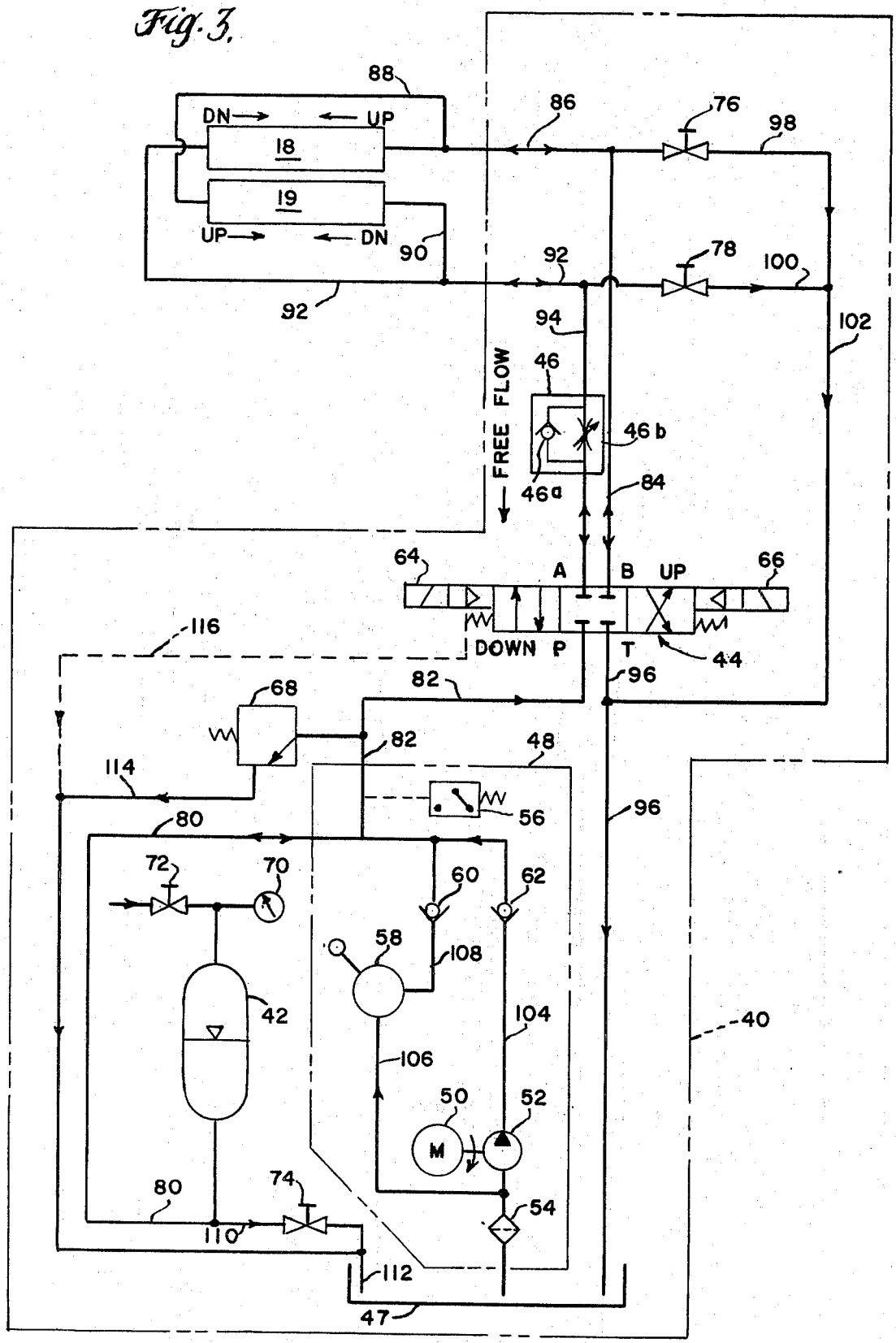

AIRCRAFT BARRICADE NET ERECTION SYSTEM

BACKGROUND OF THE INVENTION

This invention relates to actuators employed in aircraft barricade net erection systems and more particularly to rotary actuators of the rack and pinion variety.

Current barricade erection systems use a push-pull type hydraulic piston or an electric motor to raise the barricade stanchions. These devices cause the erection system to be slow and/or bulky. In the case of hydraulic pistons, separate bearing mounts must be provided for the piston to obtain proper operation. The purpose of this invention is to provide a rapid and simplified barricade erection system for the emergency arrestment of aircraft. This objective is accomplished by using a rack and pinion rotary actuator in lieu of a push-pull type hydraulic cylinder or electric motor. Since the rotary actuator is mounted directly on the stanchion shaft, no extra bearing mounts are required. This significantly simplifies the design of the raising mechanism and permits compact construction. It also allows for a very rapid raising of the barricade.

SUMMARY OF THE INVENTION

The present invention includes a barricade net connected by shear pins to two upright stanchions which are moved by rotary actuators of the rack and pinion type. The rotary actuators are powered by fluid under pressure. Pressure for the rotary actuator is provided by an accumulator. High pressure fluid in the accumulator is conducted to the proper ports of the rotary actuator cylinders by means of a solenoid controlled - pilot actuated distribution valve. The distribution valve is operated remotely by an electrical signal from a control tower or from a local station. The distribution valve also directs exhausted fluid from the rotary actuators to a reservoir open to atmosphere. The accumulator is automatically recharged by an electric motor and pump assembly. A hand pump is provided for charging the accumulator in case of a power failure. In the event of a system failure, a hand winch and cable mechanism is used to raise and lower the barricade net.

BRIEF DESCRIPTION OF THE DRAWINGS

FIG. 3 is a schematic diagram of an hydraulic system provided for each rotary actuator assembly of FIG. 1.

DESCRIPTION OF THE PREFERRED EMBODIMENT

Figure 1:
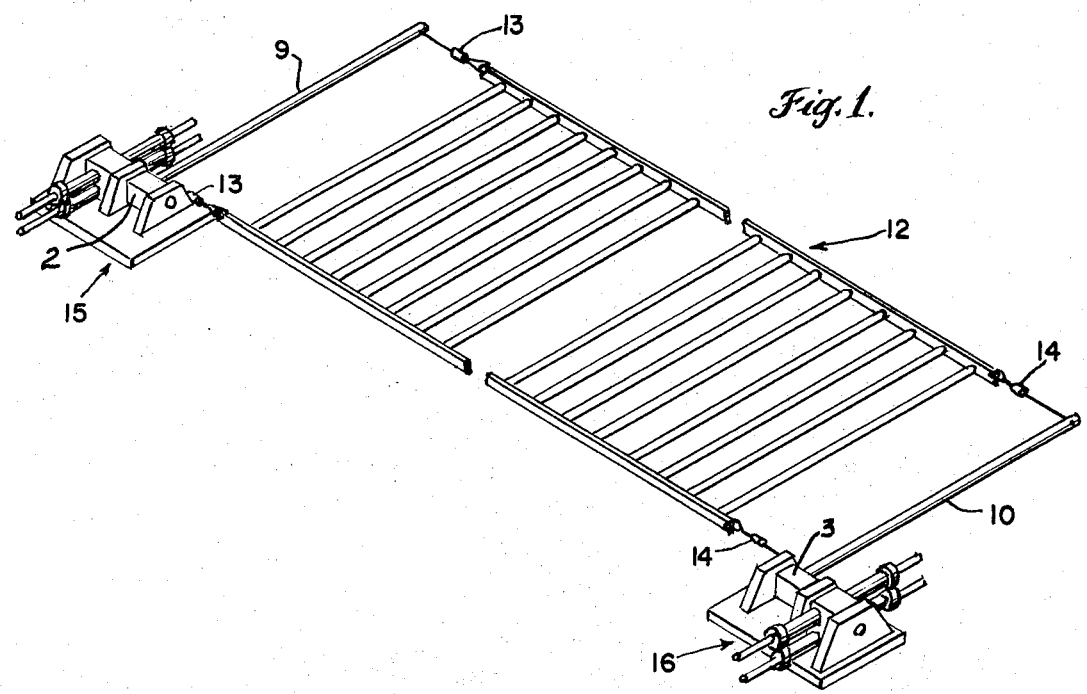
FIG. 1 illustrates an aircraft barricade erection system according to the invention including a barricade net, stanchions and rotary actuator assemblies for supporting and lifting the net and stanchions.

Referring now to FIG. 1 the erection system includes two stanchions 9 and 10 connected to a barricade net 12 by shear pins 13 and 14. The stanchions are securely connected to stanchion actuator assemblies 15 and 16 by means of trunnions 2 and 3. The barricade net spans a runway and is connected to a suitable energy absorber (not shown). It is to be understood that as the aircraft approaches the barricade net, the net is raised into the UP position and when the aircraft engages the net, the shear pins give way so as to cause the barricade net to envelop the aircraft. Thereafter, the aircraft is brought to a safe stop through the interaction of the barricade net and the energy absorber which pays out the barricade net at a predetermined rate. The stanchions are raised and lowered by two remotely controlled and hydraulically operated stanchion actuator assemblies 15, 16. Each of the stanchion actuator assemblies is powered by a hydraulic power pack described hereinbelow.

Figure 2:
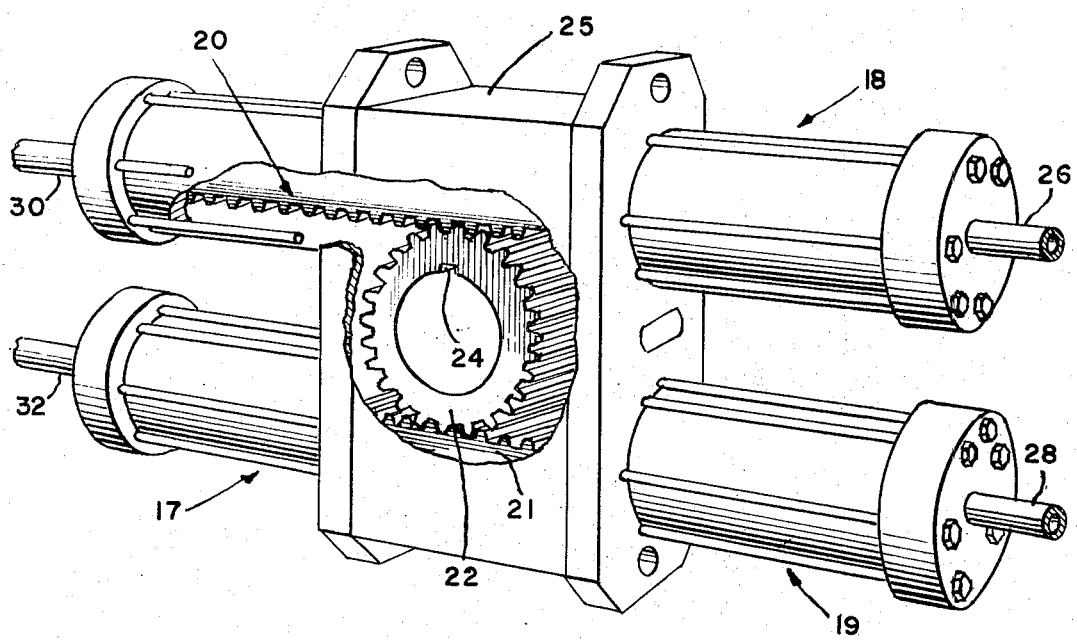
FIG. 2 illustrates a partially cutaway view of a rotary actuator according to the invention located within each rotary actuator assembly of FIG. 1.

FIG. 2 illustrates a partially cutaway view of a rotary actuator 17 contained within each of the actuator assemblies 15, 16. The rotary actuator 17 includes two racks 20, 21 contained within two cylinders 18, 19 respectively. Under the influence of high pressure fluid, the racks 20, 21, which have flat piston-like faces at both ends, move in opposite directions and cause pinion 22 to rotate in a predetermined direction. High pressure fluid is introduced into the cylinders 18, 19 by means of inlets 26, 28, 30 and 32. Keyway 24 is used to securely join the stanchion actuator assembly trunnion (2 or 3) to the rotary actuator pinion 22. Housing 25 facilitates proper positioning of racks 20 and 21 with respect to pinion 22.

The rotary actuator 17 is of conventional design and produces at least 600,000 LB-IN output torque at 3,000 psi. With a full stroke of the racks 20, 21, ninety degrees (90°) of pinion rotation is achieved. Rotary actuator seals (not shown) provide zero leakage, thereby eliminating drift.

A hydraulic power pack 40, illustrated in FIG. 3, is provided for each of the stanchion actuator assemblies 15 and 16. Each power pack includes a hydropneumatic accumulator 42 which supplies fluid under pressure to the cylinders 18 and 19 via a distribution valve 44. Each power pack 40 further includes an automatic accumulator recharge unit 48. The automatic accumulator recharge unit 48 includes a pressure switch 56, electric motor 50, hydraulic pump 52, reservoir 47, filter 54, and check valves 60 and 62. Each hydraulic power pack 40 is pressurized equally to insure synchronous operation of the actuator assemblies 15 and 16.

The distribution valve 44 is a three position solenoid controlled-pilot actuated valve of conventional design. The solenoids 64 and 66 are actuated by suitable electrical circuitry (not shown) located in a control tower near the runway upon which barricade net 12 is to be employed. The DOWN solenoid 64 and the UP solenoid 66 serve to place the distribution valve 44 in the proper mode when appropriate switches (not shown) are actuated.

When the barricade net 12 is to be raised, the UP solenoid 66 is energized thereby opening the normally closed distribution valve 44 to fluid flow. Fluid flow is from the accumulator 42 through lines 80 and 82 and thence through the UP port of distribution valve 44 to lines 84 and 86. Line 86 injects high pressure fluid into the right side of cylinder 18 and, through line 88, into the left side of cylinder 19. Return fluid is exhausted by lines 90, 92 and 94, through the flow control valve 46, through the distribution valve 44 and by line 96 to the reservoir 47.

Two features should be noted about the UP-cycle. First, the pressurized fluid passes to the cylinders 18 and 19 in an unimpeded fashion; that is, the high pressure fluid does not pass through the flow control valve 46 when moving from the accumulator 42 to the cylinders 18, 19 during the UP-cycle. Second, the exhausted fluid by-passes the variable orifice 46b of valve 46 by means of the free flow path provided within valve 46 and controlled by check valve 46a. This procedure insures that no unnecessary obstruction is placed between the accumulator 42 and the cylinders 18, 19. Hence, barricade net erection time is enhanced.

On the DOWN-cycle, the DOWN solenoid 64 is energized by an appropriate switch (not shown) so as to cause high pressure fluid to enter the left side of cylinder 18 and the right side of cylinder 19. Fluid flows from the accumulator 42 through lines 80 and 82, through the DOWN port of distribution valve 44, through the variable orifice 46b of flow control valve 46 and lines 94, 92 and 90. Exhausted fluid flows through lines 88, 86 and 84 through the distribution valve 44 and through line 96 to reservoir 47.

In contradistinction to the UP-cycle, high pressure fluid is caused to pass through the variable orifice 46b of valve 46 during the DOWN-cycle. This procedure insures a slow and controlled descent of the barricade net.

The automatic accumulator recharge unit 48 will cut in when pressure switch 56 senses a pressure drop below its setting. Motor 50 is started and drives pump 52 to recharge the accumulator 42 through line 104, check valve 62 and line 80. The pressure switch 56 senses that pressure has been restored to the accumulator 42 and the recharge unit 48 cuts out. Gauge 70 gives a visual indication of hydraulic system pressure. The recharge unit 48 permits rapid sequential raising and lowering of the barricade net by restoring the hydraulic pressure in the accumulator 42 to its initial value. A hand pump 58 is provided for manually recharging the accumulator 42 when the recharge unit fails to operate.

With the net fully raised a positive fluid lock is maintained by means of accumulator pressure and leak free seals within the rotary actuator.

Distribution valve 44 is a solenoid controlled-pilot actuated valve with an internal pilot line. This pilot line is shown as line 116 in the drawing to conform to Standard ANSY 32.10. Normally closed distribution valve 44 will not operate without sufficient pressure even though solenoid 64 or 66 is actuated.

Normally closed relief valve 68 serves to protect the system from excessive pressure by exhausting fluid into the reservoir through line 114. For manual actuation, normally closed throttle valves 76 and 78 allow fluid to drain from the cylinders 18 and 19 through lines 98, 100, 102 and 96 to the reservoir 47. Normally closed throttle valve 74 permits accumulator 42 to drain into reservoir 47 via line 112. Normally closed charging valve 72 is used for precharging accumulator 42 with nitrogen gas.

What has been described is considered to be only an illustrative embodiment of the present invention and, accordingly, it is to be understood that varous and numerous other arrangements may be devised by one skilled in the art without departing from the spirit and scope of this invention. various

What is claimed is:

1. In combination with an aircraft arresting system, said system comprising a crossrunway barrier member adapted to be engaged by an aircraft upon landing and supported at each end by a pair of stanchions mounted on opposite sides of the runway for movement between raised and lowered positions, a control means for raising and lowering said stanchions comprising:

fluid powered stanchion actuator means connected to each stanchion for raising and lowering the same and including at least one rack and pinion arranged in cooperative relationship;

hydraulic power pack means operatively connected to each said stanchion actuator means for supplying high pressure fluid to and exhausting spent fluid from said stanchion actuator means; and wherein said hydraulic power pack means includes, a three-position, solenoid-controlled distribution valve, said distribution valve having an internal pilot line arranged to prevent operation of said distribution valve in the absence of sufficient fluid pressure;

an accumulator operatively connected to said stanchion actuator means by said distribution valve;

means connected to said accumulator for recharging said accumulator;

a flow control valve hydraulically connected between said distribution valve and said stanchion actuator means;

said flow control valve including a free flow path and a variable orifice path parallel to said free flow path;

said distribution valve arranged to channel high pressure fluid directly to said stanchion actuator means and to channel exhausted fluid through said free flow path when said barrier member is raised; and said distribution valve arranged to channel high pressure fluid to said stanchion actuator means via said variable orifice path and to channel exhausted fluid around said flow control valve when said barrier member is lowered.

2. The combination according to claim 1 wherein said stanchion actuator means comprises:

a housing having four ports;

two racks contained within said housing each rack having flat piston-like faces at their respective ends; and a pinion located between said racks in operative engagement therewith, said pinion drivingly connected to said stanchion.

3. The combination according to claim 2 wherein said recharging means includes:

a pressure switch connected to sense accumulator pressure; and a motor-pump unit responsive to said switch and hydraulically connected to the accumulator for recharging the same.

4. A device for raising and lowering a member comprising:

fluid powered actuator means connected to said member for raising and lowering the same and including at least one rack and pinion arranged in cooperative relationship;

hydraulic power pack means connected to said actuator means for supplying high pressure fluid to and exhausting spent fluid from said actuator means; and wherein said hydraulic power pack means includes, a three-position, solenoid-controlled, distribution valve, said distribution valve having an internal pilot line arranged to prevent operation of said distribution valve in the absence of sufficient fluid pressure;

an accumulator operatively connected to said actuator means by said distribution valve;

means connected to said accumulator for recharging said accumulator;

a flow control valve hydraulically connected between said distribution valve and said actuator means;

said flow control valve including a free flow path and a variable orifice path parallel to said free flow path;

said distribution valve arranged to channel high pressure fluid directly to said actuator means and to channel exhausted fluid through said free flow path when said member is raised; and said distribution valve arranged to channel high pressure fluid to said actuator means via said variable orifice path and to channel exhausted fluid around said flow control valve when said member is lowered.

5. The combination according to claim 4 wherein said actuator means includes:

a housing having four ports;

two racks contained within said housing each rack having flat piston-like faces at their respective ends; and a pinion located between said racks in operative engagement therewith, said pinion being connected to said member.

* * * * *